(12) United States Patent
Treudt

(10) Patent No.: US 10,016,710 B2
(45) Date of Patent: Jul. 10, 2018

(54) FILTER APPARATUS FOR A LIQUID VESSEL, IN PARTICULAR FOR AQUEOUS UREA SOLUTION

(71) Applicant: Kautex Textron GmbH & Co. KG, Bonn (DE)

(72) Inventor: Volker Treudt, Windeck (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 14/763,704

(22) PCT Filed: Mar. 14, 2013

(86) PCT No.: PCT/EP2013/000757
§ 371 (c)(1),
(2) Date: Jul. 27, 2015

(87) PCT Pub. No.: WO2014/114306
PCT Pub. Date: Jul. 31, 2014

(65) Prior Publication Data
US 2015/0367264 A1  Dec. 24, 2015

(30) Foreign Application Priority Data

Jan. 25, 2013  (DE) .................. 10 2013 001 237

(51) Int. Cl.
*B01D 29/01* (2006.01)
*B01D 35/18* (2006.01)
*F01N 3/20* (2006.01)

(52) U.S. Cl.
CPC ............ *B01D 35/18* (2013.01); *B01D 29/01* (2013.01); *F01N 3/20* (2013.01); *F01N 3/2066* (2013.01);
(Continued)

(58) Field of Classification Search
CPC ...... B01D 29/01; B01D 35/18; B01D 29/112; B01D 29/114; B01D 29/15; B01D 35/005;
(Continued)

(56) References Cited

U.S. PATENT DOCUMENTS 2,810,482 A * 10/1957 Kasten ................... B01D 29/46
                                                        210/172.4
5,169,531 A * 12/1992 Shiraga ................ B01D 29/114
                                                        210/172.4
(Continued)

FOREIGN PATENT DOCUMENTS

DE      102009029400 A1    3/2011
DE      102010014314 A1   10/2011
(Continued)

OTHER PUBLICATIONS

English language machine translation of EP1510392, No Date, 7 pages.*
(Continued)

*Primary Examiner* — Pranav N Patel
(74) *Attorney, Agent, or Firm* — Grossman, Tucker, Perreault, Pfleger, PLLC

(57) ABSTRACT

The present invention discloses a filter apparatus (10) for a liquid vessel (30), in particular for aqueous urea solution. The filter apparatus (10) comprises a filter housing (11) having a through opening (12), and a liquid-permeable and air-impermeable filter element (16) which is connected to the filter housing (11) in such a way that the filter element (16) closes the through opening (12) of said filter housing (11) at least partially, with the result that the through opening (12) is liquid-permeable and air-impermeable. The filter apparatus (10) comprises, furthermore, at least one liquid outlet connection (17) which is fluidically connected to the through opening (12) of the filter housing (11). The filter
(Continued)

Figure 3:
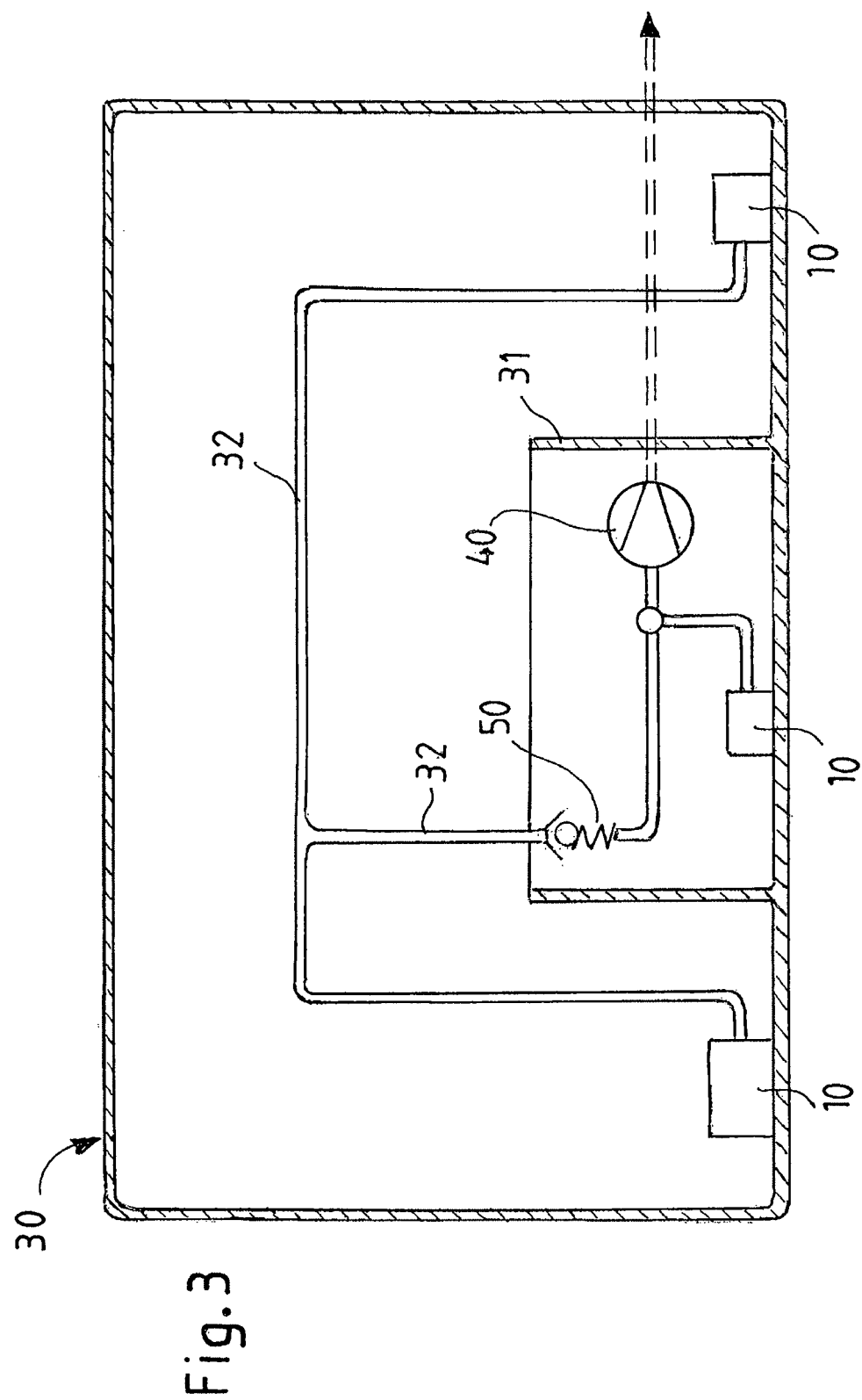

apparatus (10) according to the invention is distinguished by the fact that it comprises a heating device (20; 21, 22) which is connected directly to the filter housing (11) and/or is integrated into the filter housing (11). As a result, the volume which surrounds the filter apparatus (10) is heated reliably.

13 Claims, 2 Drawing Sheets

(52) U.S. Cl.
CPC ...... *F01N 2610/02* (2013.01); *F01N 2610/10* (2013.01); *F01N 2610/1406* (2013.01); *F01N 2610/1426* (2013.01); *Y02A 50/2325* (2018.01); *Y02T 10/24* (2013.01)

(58) Field of Classification Search
CPC ................ B01D 35/34; B01D 29/0004; B01D 29/0011; B01D 29/0095; B01D 35/0273; B01D 63/08; B01D 63/087; F01N 2610/02; F01N 2610/10; F01N 2610/1406; F01N 2610/1426; F01N 3/20; F01N 3/2066; Y02T 10/24
See application file for complete search history.

(56) References Cited

U.S. PATENT DOCUMENTS

| | | | | |
|---|---|---|---|---|
| 5,409,608 | A * | 4/1995 | Yoshida | B01D 29/15 |
| | | | | 210/315 |
| 6,736,273 | B2 * | 5/2004 | Chiga | B01D 35/027 |
| | | | | 210/172.4 |
| 9,249,709 | B2 | 2/2016 | Hodgson et al. | |
| 2009/0078692 | A1 | 3/2009 | Starck | |
| 2010/0181245 | A1 * | 7/2010 | Wehner | B01D 35/0273 |
| | | | | 210/232 |
| 2010/0294464 | A1 * | 11/2010 | Graber | B01D 29/114 |
| | | | | 165/104.19 |
| 2011/0056961 | A1 | 3/2011 | Amtmann et al. | |
| 2012/0181261 | A1 | 7/2012 | Bruck et al. | |
| 2012/0186237 | A1 * | 7/2012 | Bruck | F01N 3/2066 |
| | | | | 60/287 |
| 2013/0025269 | A1 | 1/2013 | Hodgson et al. | |
| 2013/0233850 | A1 | 9/2013 | Treudt | |
| 2013/0263938 | A1 | 10/2013 | Harr et al. | |

FOREIGN PATENT DOCUMENTS

| | | |
|---|---|---|
| DE | 102010023520 A1 | 12/2011 |
| DE | 102011105893 A1 | 12/2012 |
| EP | 0657199 A2 | 6/1995 |
| RU | 2010116531 A | 11/2011 |
| WO | WO0071883 A1 * | 11/2000 |
| WO | WO2011029780 * | 3/2011 |
| WO | WO2011124637 * | 10/2011 |

OTHER PUBLICATIONS

English language machine translation of DE 102011105893, 13 pages, No Date.*

English language PCT International Search Report dated Sep. 20, 2013, received in corresponding PCT Application No. PCT/EP13/00757, 2 pgs.

English language PCT 1st Written Opinion dated Sep. 20, 2013, received in corresponding PCT Application No. PCT/EP13/00757, 5 pgs.

English language PCT 2nd Written Opinion dated Apr. 23, 2015, received in corresponding PCT Application No. PCT/EP13/00757, 5 pgs.

English language PCT International Preliminary Report on Patentability dated Jul. 17, 2015, received in corresponding PCT Application No. PCT/EP13/00757, 6 pgs.

* cited by examiner

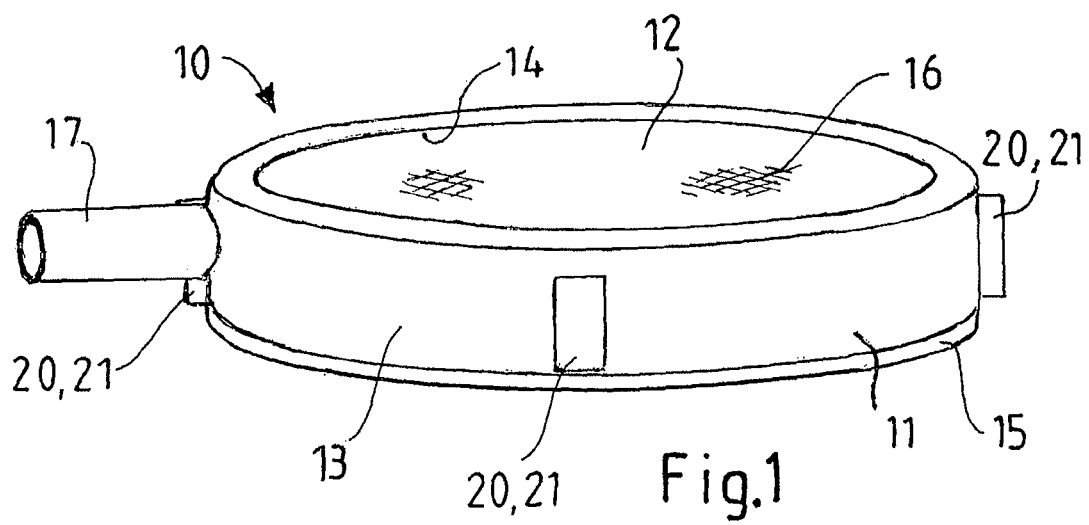
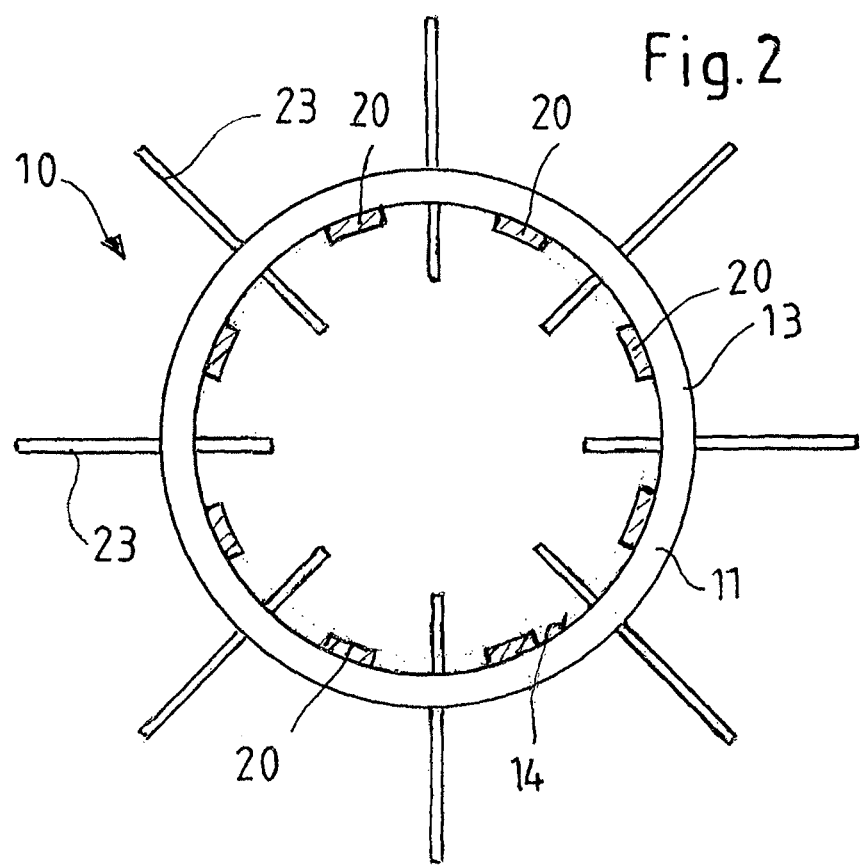

FILTER APPARATUS FOR A LIQUID VESSEL, IN PARTICULAR FOR AQUEOUS UREA SOLUTION

The invention relates to a filter apparatus for a liquid vessel, in particular for aqueous urea solution.

In automotive technology, the SCR (selective catalytic reduction) method is being used increasingly, in order to lower the nitrogen oxide emissions in diesel vehicles. The ammonia which is required for the SCR reaction is not used directly, but rather in the form of a 32.5% aqueous urea solution according to DIN 700 70. Said aqueous urea solution is injected by the SCR catalytic converter into the exhaust gas section, for example by means of a metering pump or an injector. Ammonia and $CO_2$ are produced from the urea/water solution by way of a hydrolysis reaction. The ammonia which is produced in this way can react with the nitrogen oxides in the exhaust gas and thus lower the nitrogen oxide emissions. The quantity of the injected urea is dependent on the nitrogen oxide emissions of the engine and therefore on the instantaneous rotational speed and the torque of the engine. Here, the degree of efficiency of the SCR catalytic converter is dependent on the fact that the aqueous urea solution is injected in the correct ratio to the nitrogen oxide emissions of the engine. The degree of efficiency of the nitrogen oxide reduction falls in the case of too low an injection of aqueous urea solution. If too much urea is injected, the ammonia which is formed therefrom cannot react with nitrogen oxides and pass into the surroundings. As accurate as possible a delivery of aqueous urea solution from the liquid vessel for the aqueous urea solution to the SCR catalytic converter is therefore necessary, preferably in the region of milliliters.

Since the freezing point of aqueous urea solution lies at approximately $-11°$ C. and therefore lies in the use range of motor vehicles, it is necessary to provide a heating element, with the result that possibly frozen urea solution can be thawed, with the result that the urea solution is present in the liquid phase, that is to say in aqueous form.

DE 10 2010 051 072 B4 discloses a liquid vessel for an aqueous urea solution with a buffer store. Two filter elements which are connected via a liquid line and a first valve to a liquid delivery unit for delivering urea solution are arranged in the base region of the liquid vessel. Furthermore, a further second filter element which is fluidically connected via the liquid line to the liquid delivery unit is provided in the buffer store. Furthermore, in order to thaw the urea solution, a heating element is provided for melting or heating the liquid which is situated in the buffer store. The buffer store which is configured as a splash pot is heated by means of the heating element which is arranged around the buffer store, with the result that liquid which is situated in the buffer store is thawed or heated, in order that the second filter element can operate in accordance with its function and can filter an aqueous urea solution.

When the liquid vessel which is known from DE 10 2010 051 072 B4 is started up, first of all the urea solution which adjoins the buffer store 2 is heated and thawed. Ice layers which are adjacent to the aqueous urea solution will then thaw further by way of convection, with the result that the urea solution which surrounds the second filter element is also present in aqueous form after a given time. In the case of a cold start, urea solution is therefore injected into the exhaust gas section only after a predefined time, with the result that the cold starting behavior of a liquid vessel which is known from DE 10 2010 051 072 is not optimum and the nitrogen oxide concentration can be reduced only after the thawing time of the urea solution.

DE 10 2010 014 314 A1 discloses a device for providing aqueous urea solution. The device comprises an inner support structure and an outer support structure between which a filter material is disposed. Openings are provided in the inner support structure and in the outer support structure to allow urea solution flow from the inside of a tank into the inner side of the device. The device comprises one liquid outlet connection which is fluidically connected to the openings of the inner support structure and the outer support structure. The device comprises a heating device which can be integrated in the inner support structure or in the outer support structure.

DE 10 2010 023 520 A1 discloses a heating device for heating of filter means. The device comprises a housing build of a metal and a coil connected to an alternating current source. By providing an alternate current to the coil an alternating magnetic field is induced into the housing, so that the housing is heated.

The present invention is based on the object of providing an improved filter apparatus for a liquid vessel, in particular for aqueous urea solution, and an improved liquid vessel, in particular for aqueous urea solution, which makes earlier injection of the urea solution into the exhaust gas section possible during a cold start of a motor vehicle which is equipped with the filter apparatus according to the invention.

According to the invention, the object is achieved by a filter apparatus in accordance with claim 1 and by a liquid vessel in accordance with claim 12. Advantageous refinements of the invention are specified in the subclaims.

The filter apparatus according to the invention comprises a filter housing having a through opening, and a liquid-permeable and air-impermeable filter element. Here, the filter element is connected to the filter housing in such a way that the filter element closes the through opening of the filter housing at least partially. The filter apparatus according to the invention comprises, furthermore, at least one liquid outlet connection which is fluidically connected to the through opening of the filter housing. The fluid outlet connection can be connected to a liquid delivery unit. The filter apparatus according to the invention is distinguished by the fact that it comprises a heating device which is connected directly to the filter housing and/or is integrated into the filter housing.

As a result of the provision of the heating device which is connected directly to the filter housing and/or is integrated into the filter housing, the spatial distance of the filter element from the heating element is reduced in such a way that, when the heating device is started up, the heated urea solution which is then present in the liquid state is situated more closely to the filter element, with the result that the filter element can filter aqueous liquid, that is to say, in particular, aqueous urea solution, after a short time, with the result that urea solution can be injected into the exhaust gas section of the vehicle after a short time, the result of which is that the nitrogen oxide emissions are reduced after a short time during the cold start of the vehicle. Moreover, the filter apparatus according to the invention affords the advantage that the heating device does not necessarily have to be provided separately, with the result that the number of individual parts of a liquid vessel for aqueous urea solution is reduced, which represents a cost advantage in comparison with known liquid vessels.

The filter element can be designed, for example, as a filter fabric or as a filter diaphragm. Furthermore, in the context of the present invention, liquid-permeable means that the filter element is permeable for liquid which is situated in the liquid container. In particular, liquid-permeable therefore means a liquid permeability for urea solution. Furthermore, the filter fabric preferably closes the entire through opening of the filter housing.

In the context of the present invention, air-impermeable means that the filter fabric is dimensioned in terms of the mesh size in such a way that said filter fabric does not rupture temporarily upon wetting with liquid, up to a certain differential pressure. This means that the surface tension of the liquid which wets the filter is sufficient to produce a certain barrier against the passage of air up to a certain pressure.

The filter housing is preferably designed as a heat conducting body, that is to say as a body with high thermal conductivity. This affords the advantage that the powered heating device can be attached to the filter housing, as a result of which heat which is generated by the heating device is transmitted to the filter housing which then in turn absorbs the heat uniformly and emits it uniformly to the surroundings, in particular to the melted volume in the interior of the filter housing and into the surroundings of the filter housing. The filter housing can be realized, for example, as an extruded aluminum profile. Pockets or indentations for the heating device can preferably be provided in the extruded profile.

The heating device preferably comprises at least one heating element which is fastened to an outer side of the filter housing. This makes a particularly simple connection of the filter housing to the heating device possible. Of course, the heating device can also comprise a plurality of individual heating elements which can be fastened in each case to the outer side of the filter housing.

According to a further preferred variant, the heating device comprises at least one heating element which is fastened to an inner side of the filter housing. A correspondingly configured filter apparatus affords the advantage that the melting volume within the filter housing is heated particularly effectively and efficiently, since the spacing of the heating device from the melting volume is reduced further. The heating element can be configured, for example, as a circumferential face on the inner side of the filter housing.

According to one advantageous embodiment, the heating device comprises at least one heating element which projects out of the filter housing. As a result, the volume which surrounds the heating device is thawed reliably and rapidly. The heating element which protrudes or projects out of the filter housing can be provided, for example, in the form of rods, walls or profiled webs of the filter housing. Said profiled webs, walls or rods can also extend into the interior of the filter housing.

According to a further preferred variant, the heating device comprises at least one heating element which projects into the interior of the filter housing. This has the advantage that liquid which is situated in the melting volume of the filter housing, in particular urea liquid, can be warmed or melted more effectively. This ensures that a larger area of the filter element is wetted with aqueous urea solution shortly after the cold start, with the result that a greater quantity of urea can be filtered through the filter apparatus.

According to a further preferred variant, the filter apparatus comprises a filter support which is connected to the filter housing, the filter element being attached on the filter support. Here, the filter support is configured as a heating element of the heating device. A correspondingly configured filter apparatus affords the advantage that the spacing of the filter element from the heating device is reduced further, with the result that, in the case of a cold start of the vehicle and correspondingly low external temperatures, urea solution which is present as ice can be melted very rapidly, with the result that the urea solution which bears against the filter element is present in aqueous form after a very short time. Moreover, the filter support which is configured in this way reinforces the mechanical stability of the filter element.

According to a further preferred variant, the filter housing comprises a filter housing base, the liquid outlet connection being arranged between the filter element and the filter housing base. A correspondingly configured filter apparatus can be connected to a liquid vessel, in particular for aqueous urea solution, in such a way that the filter housing base forms the liquid container base. The filter apparatus can be connected either releasably or non-releasably to the liquid vessel. In the case of a releasable connection of the filter apparatus according to the invention to the liquid vessel, the filter apparatus can be exchanged particularly simply, with the result that, in the case of clogging of the filter element, the entire filter apparatus can be exchanged simply.

The filter apparatus can be an ohmic heating resistance element and/or a PTC heating element, that is to say what is known as a self-regulating heating element consisting of PTC resistors. A PTC (positive temperature coefficient) heating element comprises an electric resistance with a positive temperature coefficient, which resistance conducts the current more satisfactorily at lower temperatures than at high temperatures, since its electric resistance increases as the temperature rises. A PTC heating element therefore operates only at a constant operating voltage as provided, since the resistance of the PTC heating element also becomes greater as the temperature rises and therefore the heat output decreases. This has the advantage that, in the case of the filter apparatus becoming dry and a corresponding low heat output to the liquid, the filter apparatus according to the invention is not overheated.

A liquid vessel according to the invention, in particular for aqueous urea solution, comprises a liquid delivery unit which is arranged in the liquid vessel, the liquid vessel being distinguished by the fact that it comprises at least one of the above-described filter apparatuses which is arranged in the interior of the liquid vessel, the liquid delivery unit being fluidically connected via a liquid line to the liquid outlet connection of the filter apparatus.

One preferred variant of the liquid vessel comprises a buffer store which is arranged in its interior, the filter apparatus being arranged in the interior of the buffer store.

In the following text, the invention will be explained in greater detail using drawings, in which, in detail:

FIG. 1 shows a perspective illustration of a filter apparatus according to a first embodiment of the present invention, FIG. 2 shows a plan view of a diagrammatic illustration of a filter apparatus according to a further embodiment of the present invention, and FIG. 3 shows a sectional view of a liquid vessel according to the invention, in particular for aqueous urea solution.

In the description which now follows, identical designations denote identical components or identical features, with the result that a description with regard to one component which is made once in relation to one drawing also applies to the remaining drawings or figures, with the result that a repetitive description is avoided.

FIG. 1 shows a three-dimensional illustration of a first embodiment of a filter apparatus 10 according to the invention. The filter apparatus 10 is configured for use in the liquid vessel 30 (see FIG. 3), in particular for aqueous urea solution. The filter apparatus 10 comprises a filter housing 11 which is of cylindrical shape in FIGS. 1 and 2, has a through opening 12 and comprises a filter element 16 which is liquid-permeable and air-impermeable. In the present case, liquid-permeable means liquid permeability for the liquid which is situated in the liquid vessel. If the liquid which is contained in the liquid vessel 30 is a urea solution, the filter element 16 is permeable for the urea solution. The filter element 16 can be configured, for example, as a filter fabric 16.

The filter element 16 is connected to the filter housing 11 in such a way that the filter element 16 closes the through opening 12 of the filter housing 11. The through opening 12 of the filter housing 11 is therefore liquid-permeable and air-impermeable.

Furthermore, the filter apparatus 10 comprises a liquid outlet connection 17 which is fluidically connected to the through opening 12 of the filter housing.

The liquid outlet connection 17 can be connected, for example, via a liquid line 32 (FIG. 3) to a liquid delivery unit 40 (FIG. 3). The liquid delivery unit can be configured, for example, as a pump 40. By generation of a vacuum by means of the pump 40, urea solution or liquid which is situated in the liquid vessel 30 is sucked through the filter element 16 into the interior of the filter apparatus 10, with the result that the urea solution is filtered by means of the filter fabric 16. The filtered urea solution is then pumped via the liquid outlet connection 17 to the liquid delivery unit 40 and is pumped out of the liquid vessel 30 by means of the liquid delivery unit 40.

Furthermore, the filter apparatus 10 which is shown in FIG. 1 comprises a filter housing base 15 which is arranged so as to lie opposite the through opening 12 and therefore the filter element 16. Here, the liquid outlet connection 17 is arranged between the filter element 16 and the filter housing 15. The volume which surrounds the filter apparatus 10 is also called the melting volume. Here, the melting volume also comprises the volume which is situated between the filter housing base 15 and the filter element 16. As has already been mentioned above, the melting volume can be pumped away via the liquid outlet connection 17.

Furthermore, the filter apparatus 10 which is shown in FIG. 1 comprises a heating device 20, 21 which, in the exemplary embodiment which is shown, comprises a plurality of heating elements 21 which are fastened to an outer side 13 of the filter housing 11. The heat which is generated by means of the heating elements 21 is transmitted to the filter housing 11 which is configured as a heat conducting body 11, with the result that the melting volume which surrounds the filter housing 11 is heated. The filter element 16 does not necessarily have to be arranged on the edge side of the through opening 12 of the filter housing 11, but rather can also be arranged centrally in the filter housing 11, with the result that a filter housing wall is situated above and below the filter element 16.

The filter apparatus 10 which is shown in FIG. 1 can be arranged in the liquid vessel 30 in such a way that either the filter housing base 15 or the filter element lies opposite the base of the liquid vessel 30. Furthermore, the filter apparatus 30 can be positioned in a pump well of the liquid vessel 30. If the filter element 16 is arranged so as to lie opposite the base of the liquid vessel 30, the liquid in the liquid vessel 30 can be sucked out almost completely, since the liquid collects at the base of the liquid vessel 30. In the case of a corresponding arrangement of the filter apparatus 10 in the liquid vessel 30, it is to be ensured that the filter element 16 is fluidically connected to the interior of the liquid vessel 30 by, for example, the filter element 16 and the base of the liquid vessel 30 being separated from one another by a gap.

Furthermore, it is also possible to provide a second filter element 16 instead of the filter housing base 15, with the result that the filter housing 11 is closed by two filter elements 16.

Furthermore, the filter housing base 15 can be configured to be elastic, that is to say deformable, with the result that, in the case of a suction operation via the liquid outlet connection 17, the volume between the filter housing base 15 and the filter element 16 within the filter apparatus 10 is reduced. As a result, at least part of the volume which is enclosed by the filter housing 11 can be utilized as delivery volume if the filter apparatus 10 runs dry briefly. Running dry of this type is possible briefly, in particular as a result of dynamic-movement operations. On account of the temporary air impermeability of the filter element 16, since the latter is still as a rule wetted with liquid, the pressure difference which is produced and the resilience of the filter housing base 15 can be utilized to deliver another part of the volume which is enclosed by the filter housing 11. The filter housing base 15 can comprise, for example, a rubber or a rubber mixture.

FIG. 2 shows a plan view of a filter apparatus 10 according to a second embodiment of the present invention. In the case of the filter apparatus 10 which is shown in FIG. 2, the liquid outlet connection 17 is not shown for reasons of simplicity. However, it goes without saying that the filter apparatus 10 according to the second embodiment also comprises a liquid outlet connection 17.

In the case of the filter apparatus 10 which is shown in FIG. 2, the filter housing 11 comprises heat conducting rods 23 which extend radially away from the filter housing 11, and the heating device 20 comprises at least one heating element 22 which is fastened to an inner side 14 of the filter housing 11. As shown in FIG. 2, a plurality of heating elements 22 which are fastened to the inner side 14 can also be provided which are arranged at angular spacings from one another. As an alternative, a heating element 22 which runs around on the inner side 14 can also be provided.

The heating element 22 which is fastened to the inner side 14 of the filter housing 11 ensures particularly effective heating of the melting volume which is situated in the interior of the filter housing 11. By provision of the heat conducting rods 23, the surroundings of the filter housing 11 can be heated in a further improved manner, with the result that ice which is situated in the surroundings of the filter housing 11 can be melted particularly effectively.

In the case of all the heating elements 21, 22 which are shown in FIGS. 1 and 2, they can be, for example, heating resistance elements 21, 22 which are heated in accordance with the ohmic principle by passing an electric current through them.

Moreover, the heating resistance elements 21, 22 can be configured as what are known as PTC heating elements, that is to say as PTC resistors. PTC heating elements have the advantage that they operate as intended only with a constant operating voltage, with the result that the resistance of the PTC heating element rises as a temperature rises and therefore the heat output of the PTC heating element decreases. Overheating of the PTC heating elements is therefore suppressed effectively.

As an alternative and/or in addition, it is also possible that the heating device 20 is integrated into the filter housing 11. For this purpose, for example, heating elements in the form of heating wires which are preferably insulated electrically with regard to the filter housing 11 can be arranged and/or integrated on the inner and/or the outer and/or in the material wall of the filter housing 11. The filter housing is composed of or comprises a plastic with high thermal conductivity.

Both the heating elements 20, 21, 22 and the filter housing 11 including possibly present heat conducting rods 23 can be encapsulated with plastic. If the filter housing 11 and/or the heating element 20, 21, 22 are/is formed from a metal, they are protected effectively against corrosion on account of the plastic encapsulation.

FIG. 3 shows a sectional view of a liquid vessel 30 according to the invention, in particular for an aqueous urea solution. Here, the liquid vessel 30 comprises a buffer store 31, in the form of a splash pot 31, which is arranged on the base of the liquid vessel 30 in the installed position. Furthermore, the liquid vessel 30 comprises a liquid delivery unit 40, in the form of a pump, which is arranged within the buffer store 31 and two filter apparatuses 10 which are arranged on the base outside the buffer store 31 in the installed position and are in each case connected via a liquid line 32 to the liquid delivery unit 40. Furthermore, in the buffer store 31, a further filter apparatus 10 is arranged in the base region of the buffer store 31, which further filter apparatus 10 is likewise fluidically connected via a liquid line 32 to the liquid delivery unit 40. Furthermore, the liquid vessel 30 comprises a valve 50 which is in each case fluidically connected to the filter apparatuses 10 outside the buffer store 31 and, moreover, to the filter apparatus 10 which is arranged within the buffer store 31 and, moreover, to the liquid delivery unit 40.

LIST OF DESIGNATIONS

10 Filter apparatus
11 Filter housing/heat conducting body/resistance heating element
12 Through opening (of the filter housing)
13 Outer side (of the filter housing)
14 Inner side (of the filter housing)
15 Filter housing base
16 Filter element/filter fabric
17 Liquid outlet connection
20 Heating device
21, 22 Heating element/heating resistance element/PTC heating element
23 Heat conducting rod
30 Liquid vessel
31 Buffer store/splash pot (of the liquid vessel)
32 Liquid line
40 Liquid delivery unit
50 Valve

What is claimed is:

1. An aqueous liquid filter apparatus for an aqueous liquid containment vessel, the filter apparatus comprising:
   a filter housing having a through opening, and a filter housing base configured to connect the filter housing to the liquid containment vessel;
   a liquid-permeable and air-impermeable filter element, the filter element liquid-permeable when exposed to the aqueous liquid and air-impermeable when wetted by the aqueous liquid and exposed to air, and wherein the filter element is completely planar;
   the filter element connected to the filter housing such that the filter element at least partially closes the through opening of said filter housing, with the result that the through opening is liquid-permeable and air-impermeable;
   at least one liquid outlet connection fluidically connected to the through opening of the filter housing, the at least one liquid outlet connection arranged between the filter element and the filter housing base, wherein the filter housing base is not another filter element;
   a heating device, the heating device connected directly to the filter housing and/or is integrated into the filter housing; and
   the filter housing configured as a heat conducting body and including at least one heat conducting rod which projects out of the filter housing.

2. The filter apparatus as claimed in claim 1, wherein the heating device comprises at least one heating element which is fastened to an outer side of the filter housing.

3. The filter apparatus as claimed in claim 2, wherein:
   the filter housing comprises a metallic material;
   the filter housing is configured as an extruded profile;
   at least one depression is provided in the outer side of the filter housing; and
   the heating element is arranged in the depression.

4. The filter apparatus as claimed in claim 1, wherein the heating device comprises at least one heating element which is fastened to an inner side of the filter housing.

5. The filter apparatus as claimed in claim 1, wherein the heating device comprises at least one heating element which projects into the interior of the filter housing.

6. The filter apparatus as claimed in claim 1, wherein:
   the filter apparatus comprises a filter support which is connected to the filter housing;
   the filter element is attached on the filter support; and
   the filter support is configured as a heating element of the heating device.

7. The filter apparatus as claimed in claim 1, wherein:
   the filter housing base lies opposite the filter element; and
   the liquid outlet connection is arranged on a vertical wall of the filter housing.

8. The filter apparatus as claimed in claim 1, wherein the filter apparatus comprises a heating resistance element.

9. The filter apparatus as claimed in claim 8, wherein the heating resistance element is configured as a positive temperature coefficient heating element.

10. An aqueous liquid containment vessel, comprising:
    a liquid delivery unit arranged in the liquid containment vessel;
    at least one aqueous liquid filter apparatus arranged in the liquid containment vessel, the filter apparatus including
    a filter housing having a through opening, and a filter housing base configured to connect the filter housing to the liquid containment vessel,
    a liquid-permeable and air-impermeable filter element, the filter element liquid-permeable when exposed to the aqueous liquid and air-impermeable when wetted by the aqueous liquid and exposed to air, and wherein the filter element is completely planar,
    the filter element connected to the filter housing such that the filter element at least partially closes the through opening of said filter housing, with the result that the through opening is liquid-permeable and air-impermeable,
    at least one liquid outlet connection fluidically connected to the through opening of the filter housing, the at least one liquid outlet connection arranged between the filter element and the filter housing base, wherein the filter housing base is not another filter element, a heating device, the heating device connected directly to the filter housing and/or is integrated into the filter housing, the filter housing configured as a heat conducting body and including at least one heat conducting rod which projects out of the filter housing, and the liquid delivery unit fluidically connected via a liquid line to the liquid outlet connection of the filter apparatus.

11. The liquid containment vessel as claimed in claim 10, further comprising:

the liquid containment vessel comprises a buffer store which is arranged in its interior, wherein the buffer store comprises a splash pot; and the filter apparatus is arranged in an interior of the splash pot.

12. The liquid containment vessel as claimed in claim 10, further comprising:

the liquid containment vessel comprises a buffer store which is arranged in its interior, wherein the buffer store comprises a splash pot; and the filter apparatus is arranged outside an interior of the splash pot.

13. The liquid containment vessel as claimed in claim 10, further comprising: a plurality of the filter apparatuses arranged in the liquid containment vessel.

* * * * *